United States Patent Office 2,748,993
Patented June 5, 1956

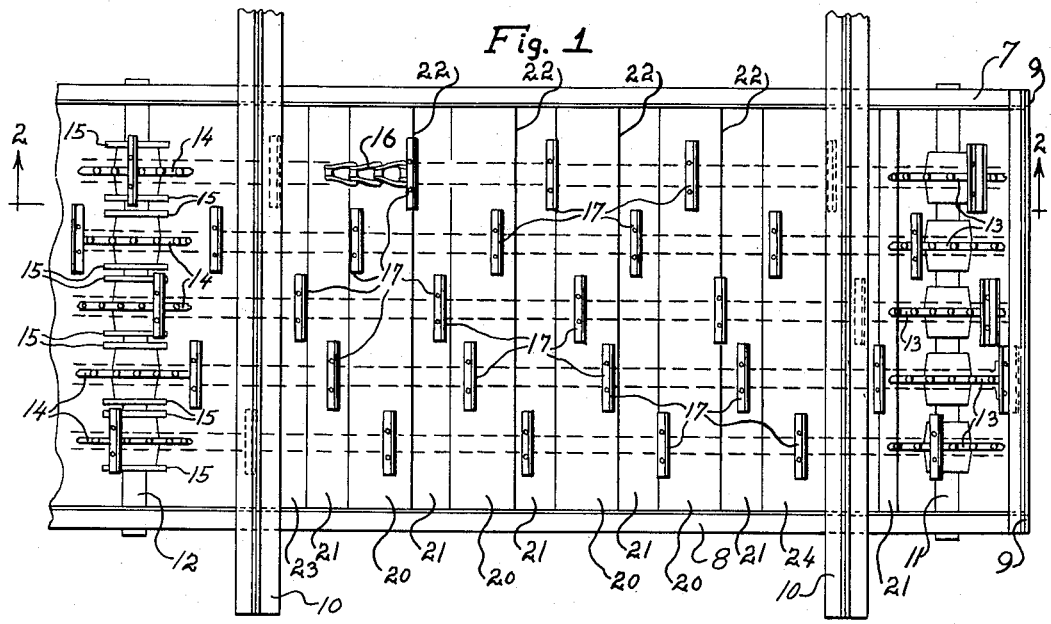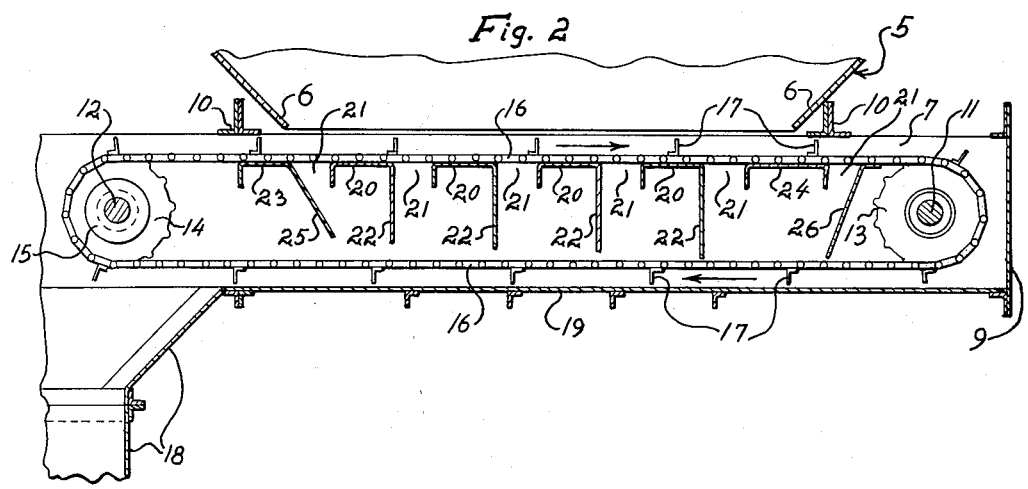

2,748,993

CONVEYOR MECHANISM FOR REMOVING PULVERIZED MATERIAL FROM STORAGE BINS AND THE LIKE

Victor E. Forrest, Minneapolis, Minn.

Application April 25, 1952, Serial No. 284,367

2 Claims. (Cl. 222—415)

This invention relates to a conveyor mechanism for discharging at a measured rate of flow and particularly adapted for use in unloading flour storage bins and the like.

It has long been a problem to remove pulverized material such as flour and the like having relatively high internal friction from storage bins and the like since, if the lower discharge opening of the bin is diminished from the cross-sectional size of the bin bottom, such material has a tendency to arch across the opening and clog the same.

It is therefore an object of my invention to provide a novel and improved conveyor mechanism particularly constructed of simplified design to underlie substantially the entire bin bottom to not only uniformly remove by a scraping action the material therefrom but to also carry said material thus removed at a measured rate of flow to a suitable discharge location.

It is a further object of my invention to provide a conveyor mechanism particularly adapted for use in unloading flour storage bins and the like and constructed to receive the flour from a discharge opening underlying substantially the entire bottom of the bin and to deliver the same at a measured rate of flow in a substantially continuous discharge to a suitable delivery location.

It is another object to provide a conveyor mechanism having means for uniformly spreading the pulverized material carried thereby to insure a predetermined volume of material being constantly carried whereby the rate of travel of the conveyor controls and measures the rate of discharge flow therefrom.

More specifically, it is an object to provide a conveyor mechanism adapted to be mounted to receive finely divided material from above and permit the same to travel downwardly through the upper run of the conveyor mechanism and to be delivered by the lower run thereof to a discharge location and including spreading means for maintaining a predetermined depth of material across the entire delivery run of the conveyor whereby the rate of flow from said conveyor is governed solely by the speed of travel thereof.

Still more specifically, it is an object of my invention to provide a conveyor mechanism particularly adapted to receive material from above and to permit pulverized material to fall through the upper run of the conveyor mechanism onto an imperforate conveyor deck with the lower run of the conveyor mechanism traveling in close association above said deck to carry the material from the rear end thereof and deliver the same from the forward end of said deck, said mechanism including a plurality of spreader members for evenly distributing a layer of predetermined depth across the entire width of the deck whereby a full conveyor load is always maintained and the rate at which the conveyor travels controls the measured flow discharged therefrom.

It is still another object to provide an endless slat conveyor mechanism having an upper run and a lower run spaced therebelow, the slats of the upper run traveling across substantially the entire area of the bin bottom to positively remove material therefrom and overlying an upper distribution deck having a plurality of transversely disposed distribution openings extending thereacross and longitudinally spaced one from the other, and the lower run traveling across an imperforate conveyor deck disposed immediately below said lower run, a plurality of depending distributing spreading members extending downwardly at the forward edges of said transverse distribution openings and having their lower edges disposed in predetermined spaced relation above the imperforate conveyor deck and lower conveyor run with the forward spreader members being spaced a greater distance above said deck than the rear spreader members.

These and other objects and advantages of my invention will more fully appear from the following description made in connection with the accompanying drawings wherein like reference characters refer to the same or similar parts throughout the several views, and in which:

Fig. 1 is a top plan view showing my conveyor mechanism; and

Fig. 2 is a vertical sectional view taken substantially along the line 2—2 of Fig. 1.

As illustrated in the accompanying drawing, I show a conveyor mechanism adapted to be positioned below the discharge outlet of a flour storage bin such as the bin 5 having only a slightly tapered discharge portion 6 at the lower end thereof. The entire conveyor mechanism underlies substantially the entire cross-sectional area of the bin and the flour or other pulverized material is only slightly confined by the slightly tapered discharge side of the discharge portion 6.

A suitable supporting structure is provided having side walls 7 and 8 and a rear end wall 9, as best shown in the drawing. A pair of longitudinally spaced transversely disposed parallel frame members 10 overlie the upper portions of the conveyor sides 7 and 8 to reinforce the same and assist in mounting said conveyor below the discharge end 6 of the bin 5. A pair of shafts 11 and 12 have their ends journalled in the sides of the conveyor box and, in the form shown, the rear shaft 11 is driven from any suitable source of rotary power (not shown).

In the form of the invention illustrated, the drive shaft 11 has a plurality of driving sprockets 13 fixed thereto and disposed in laterally spaced apart relation thereon. A similar number of sprockets are mounted in similarly spaced relation on idler shaft 12 and, in the form shown, said sprockets, designated by the numeral 14, are journalled on said shaft 12 for independent rotation, one relative to the other for purposes that will be brought out later herein. Each pocket has a pair of set collars 15 respectively mounted at the sides thereof and fixed to the shaft 12 to prevent lateral shifting of the sprockets 14 along the axis of the shaft. Each of the driving sprockets 13 has an endless link type chain 16 trained therearound to be driven thereby and said chains are also trained about the respectively opposed idler sprockets 14. Each chain 16 has a plurality of short individual cross slats 17 fixed thereto in spaced relation therealong. These slats on adjacent chains are staggered to produce a substantially continuous flow of material from said conveyor into a suitable collection structure such as the hopper 18.

An imperforate flat panel 19 forms the bottom of the conveyor box and provides a material carrying deck across which the conveyor slats 17 drag the material from the rear of the deck 19 to deliver the same into the hopper 18. The chains 16, of course, are traveling from the front to the rear on the top runs thereof and from the rear to the front on the bottom runs thereof, as indicated by the arrows of Fig. 2. An upper distributing deck is, in the form illustrated, formed from a plurality of transversely disposed individual platform elements 20 extending transversely between the sides 7 and 8 and spaced apart to provide distribution openings 21 therebetween. A plurality of spaced material distributing and spreading members 22 are respectively fixed in depending relation along the rear edge of each platform element 20. The lower edges of said distributing and spreading members 22 are disposed in spaced relation above the conveyor deck 19 with the most rearwardly disposed spreading member 22 being closely spaced above the lower runs of the chains 16 and the lower edges of the other members 22 being disposed in progressively increasing spaced relation above said platform toward the front thereof, as best shown in Fig. 2.

A front top platform element 23 and a rear platform element 24 are provided and a front guiding baffle 25 extends downwardly in rearwardly sloping relation from the rear edge of the front platform element 23. A rear guiding baffle 26 extends downwardly in forwardly sloping relation with its upper portion spaced rearwardly from the rear edge of the rear platform element 24. These two guiding baffles slope toward the center of the conveyor mechanism and tend to guide the material toward the center of the lower run of the conveyor mechanism, with the lower edge of the front guiding baffle 25 disposed in slightly greater spaced relation above the deck 19 than the next rearwardly spaced depending baffle 22 and the rear guiding baffle 26 substantially prevents the material from being carried around the sprocket wheels 13.

The following is a description of the operation of my improved conveyor mechanism for unloading storage bins for flour and the like. The force of gravity constantly urges the flour or other material contained within the bin 5 downwardly therein and normally causes the discharge of said material through the slightly converging portion 6 at the lower end thereof. The cross slats of the upper runs of the conveyor mechanism positively engage the lowermost material discharged through the opening at the bottom of bin 5 and scrape the same into the respective openings 21. It should be noted that these cross slats of the upper run scarify and loosen the material across the entire bottom area of the bin 5 and produce an even flow across said entire area to constantly draw said material from the bottom of the bin and prevent a hollow upstanding opening from forming up through the material to draw material directly from the top over a certain area thereof while the internal friction of the particles of the pulverized material bridges across the remainder of the opening. Thus, an even flow of material is produced through the openings 21 thus insuring that a full supply load is provided behind each of the baffles 22. Unless the conveyor mechanism is in operation, the pulverized material is of course retained between the front and rear guiding baffles 21 and 26 and is not discharged into the hopper 18. However, as soon as the conveyor mechanism is put into operation and the slats 17 scrape the material into the distribution openings 21 and therethrough onto the imperforated deck panel 19, said material is picked up by the slats of the lower runs of the conveyor mechanism and is carried from the rear to the front end thereof and discharged into the hopper 18.

Obviously, the pulverized material is piled up behind each of the spreading and distributing baffles 22 as well as the forward guiding baffle 25. This of course causes the flour to be distributed evenly at a uniform depth the entire distance across the imperforate bottom deck panel 19 and, as more material is added to the lower run of the conveyor, the lower edges of the distributing and spreading baffles 22 are progressively raised toward the front of the conveyor mechanism and the guiding baffle 25 has its lower edge disposed slightly above the next adjacent rearwardly disposed spreading baffle 22 so that when the material passes under the lower edge of said spreading baffle 25 said slats are carrying a full load of said material at the uniformly distributed depth across the entire deck panel 19. Without the spreading baffles 22 and guiding and spreading baffle 25, the finely divided pulverized material such as flour would have a natural tendency to be distributed in an uneven depth across the width of said deck panel 19. The combination of the rearwardly traveling cross slats 17 on the upper runs of the conveyor mechanism delivering the flour downwardly to the cross slats of the lower runs through the respective openings 21 and along the rear surfaces of the respective guiding and spreading baffles 22 and baffle 25 and downwardly along the front surface of guiding baffle 26 produces an extremely efficient conveyor mechanism which completely underlies the entire discharge opening of substantially the same cross-sectional area as the bin structure itself and which will deliver the material discharged thereto at a rate of flow governed solely by the speed at which the conveyor mechanism is driven since precisely the same volume of pulverized material is being carried across the imperforate deck panel 19 at any particular instant.

The staggered arrangement of the cross slats 17, as best shown in Fig. 1, produces a substantially continuous flow of flour into the collection hopper 18 and these slats 17 of course drag the flour from the rear to the front of the imperforate material carrying deck panel 19. The individually journalled idlers 14 greatly facilitate the desired positioning of the respective cross slats and, due to variations in the manufacture of link chains, the tension in the respective chains 16 would be difficult to equalize and thus prevent binding unles each of the chains is independent of the others. This independent mounting automatically substantially eliminates any binding of the chains on the respective idler sprockets and permits quick and easy adjustment of the relative positions of the cross slats 17. It should be noted, of course, that all of the baffles 22, 25 and 26 extend the full width of the conveyor as do the openings 21 and this width is substantially equal to the full width of the bin structure 5 disposed thereabove. The length of the conveyor mechanism between the upper ends of baffles 25 and 26 is also substantially equal to the length of the bin structure disposed thereabove and the opening 21 disposed adjacent the rear baffle 26 is disposed slightly rearwardly of the rear end of the discharge opening at the bottom of the bin to prevent the pulverized material from being carried around behind the sprocket wheels 13.

It will be seen that I have provided a novel and highly efficient conveyor mechanism particularly designed to receive material from a discharge opening having a relatively large area and thus preventing clogging of material and other highly pulverized products due to the relatively high internal friction thereof. This relatively simple, yet highly efficient mechanism, is not only adapted to receive material from a relatively large discharge area but is also constructed to carry a substantially constant volume of material at any particular instant so that the rate of discharge from the lower run of the conveyor will vary directly with the speed at which the conveyor is driven and can be easily calibrated in any desired manner to discharge a measured flow of grain into a suitable collection location such as the hopper 18.

It will, of course, be understood that various changes may be made in the form, details, arrangement, and proportions of the parts without departing from the scope of my invention which, generally stated, consists in the matter shown and described herein and set forth in the appended claims.

What I claim is:

1. A conveyor mechanism for delivering a measured flow of finely divided material from a storage bin or the like, said conveyor mechanism comprising a pair of spaced substantially horizontal top and bottom platforms adapted to underlie the discharge opening of a material storage bin, the top platform having a plurality of openings therethrough to form a material distributing platform, the lower platform being imperforate and forming a material carrying deck and having a discharge end, moving conveyor means travelling across the upper platform to positively remove the material from the entire bottom area of the discharge opening of the bin and positively carrying the removed material across the openings in said upper platform to deliver the same downwardly through said openings onto the lower material carrying deck, a plurality of spaced, fixed cross baffles having their lower edge portions disposed in progressively increasing spaced relation toward the discharge end of said material carrying deck to effectively spread the material across the entire width of a second conveyor means, said second conveyor means being interposed between the lower edge of said baffles and said bottom material carrying deck to carry the material from one end of said deck to the discharge end thereof, said baffles causing said second conveyor to be fully loaded with a predetermined volume of material at the discharge end thereof so that the rate of discharge therefrom may be accurately controlled by the speed at which the second mentioned conveyor means is driven.

2. A conveyor mechanism for delivering a measured flow of finely divided material from a storage bin or the like, said conveyor mechanism comprising a pair of spaced substantially horizontal top and bottom platforms adapted to underlie the discharge opening of a material storage bin, the top platform having a plurality of openings therethrough to form a material distributing platform, the lower platform being imperforate and forming a material carrying deck and having a discharge end, endless moving conveyor means having an upper and a lower run with the upper run thereof travelling across the upper platform and the lower run thereof travelling across the lower material carrying deck, a plurality of conveyor slats carried by said endless conveyor and disposed normally to the direction of travel of said conveyor to positively scrape material from the bottom of the storage bin and discharge the same through said openings in the upper platform onto the lower material carrying deck, a plurality of spaced fixed cross baffles having the lower edge portions thereof spaced above the lower material carrying deck, the lower run of said conveyor means carrying material from one end of said deck to the discharge end thereof, said baffles causing said conveyor plates to be fully loaded with a predetermined volume of material at the discharge end of said deck so that the rate of discharge therefrom may be accurately controlled by the speed at which said conveyor means is driven.

References Cited in the file of this patent
UNITED STATES PATENTS

| | | |
|---|---|---|
| 1,416,416 | Redler | May 16, 1922 |
| 1,695,272 | Christian et al. | Dec. 18, 1928 |
| 1,977,513 | Holbeck | Oct. 16, 1934 |
| 2,007,874 | Redler | July 9, 1935 |
| 2,519,929 | Redler | Aug. 22, 1950 |